United States Patent [19]

Klimek et al.

[11] Patent Number: 5,587,436
[45] Date of Patent: Dec. 24, 1996

[54] PROCESS FOR CONTROLLING THE POLYMERIZATION OF PROPYLENE AND ETHYLENE AND COPOLYMER PRODUCTS

[75] Inventors: Thaddeus W. Klimek, Orland Park; Michael B. Edwards, Minooka, both of Ill.

[73] Assignee: Quantum Chemical Corporation, Cincinnati, Ohio

[21] Appl. No.: 302,150

[22] Filed: Sep. 8, 1994

Related U.S. Application Data

[63] Continuation of Ser. No. 975,487, Nov. 12, 1992, abandoned.

[51] Int. Cl.[6] ........................................ C08F 2/34
[52] U.S. Cl. ........................ 526/59; 526/60; 526/87; 526/348.8
[58] Field of Search .................. 526/59, 60, 87, 526/348.8

[56] References Cited

U.S. PATENT DOCUMENTS

| | | | |
|---|---|---|---|
| 3,220,998 | 11/1965 | Berger | 526/65 |
| 4,003,712 | 1/1977 | Miller | 526/59 |
| 4,048,412 | 9/1977 | Caumartin et al. | 526/65 |
| 4,260,710 | 4/1981 | Staiger et al. | 526/142 |
| 4,309,521 | 1/1982 | Sato et al. | 526/114 |
| 4,338,424 | 7/1982 | Morita et al. | 526/65 |
| 4,360,650 | 11/1982 | Desvignes et al. | 526/60 |
| 4,420,592 | 12/1983 | Kato et al. | 526/65 |
| 4,454,299 | 6/1984 | Schweier et al. | 525/53 |
| 4,455,405 | 6/1984 | Jaggard et al. | 525/53 |
| 4,547,552 | 10/1985 | Toyota et al. | 525/247 |
| 4,582,878 | 4/1986 | Chiba et al. | 525/268 |
| 4,703,094 | 10/1987 | Raufast | 526/65 |
| 4,739,015 | 4/1988 | Toyota et al. | 525/270 |
| 4,740,550 | 4/1988 | Foster | 525/52 |
| 4,740,551 | 4/1988 | Foster | 525/52 |
| 4,814,377 | 3/1989 | Joyce | 525/53 |
| 4,820,775 | 4/1989 | Shiga et al. | 525/247 |
| 4,863,769 | 9/1989 | Lustig et al. | 526/348.1 |
| 4,882,380 | 11/1989 | Ficker et al. | 525/53 |
| 4,950,631 | 8/1990 | Buehler et al. | 526/119 |
| 4,977,210 | 12/1990 | Kerth et al. | 525/53 |
| 4,978,722 | 12/1990 | Goko et al. | 525/53 |
| 5,006,600 | 4/1991 | Buechner et al. | 525/53 |
| 5,034,365 | 7/1991 | Buehler et al. | 526/119 |
| 5,037,789 | 8/1991 | Buehler | 526/119 |
| 5,047,468 | 9/1991 | Kiu et al. | 525/53 |
| 5,051,388 | 9/1991 | Buehler et al. | 502/113 |
| 5,104,949 | 4/1992 | Buehler et al. | 526/116 |
| 5,143,883 | 9/1992 | Buehler et al. | 526/119 |

FOREIGN PATENT DOCUMENTS

| | | |
|---|---|---|
| 0050013 | 4/1982 | European Pat. Off. . |
| 0074194 | 3/1983 | European Pat. Off. . |
| 0225099A2 | 6/1987 | European Pat. Off. . |
| 0276734 | 8/1988 | European Pat. Off. . |
| 4000224A1 | 12/1990 | European Pat. Off. . |
| 442316A2 | 8/1991 | European Pat. Off. . |

OTHER PUBLICATIONS

Ross, J. F., et al., "An Improved Gas–Phase Polypropylene Process," *Ind. Eng. Chem. Prod. Res. Dev.* (1985), 24:149–154.

Randall, J. C., "A Review of High Resolution Liquid [13]Carbon Nuclear Magnetic Resonance Characterizations of Ethylene–Based Polymers," *JMS–Rev. Macromol. Chem. Phys.*, C29 (2 & 3), 201–317 (1989).

Wild, L., et al., "Development of High Performance TREF for Polyolefin Analysis," Proceedings of Am. Chem. Soc., Div. of Polym. Mat. Sci. and Eng. 67:153.

*Primary Examiner*—Thomas R. Weber
*Attorney, Agent, or Firm*—Gerald A. Baracka; William A. Heidrich

[57] ABSTRACT

An improved gas-phase copolymerization process for producing copolymers of propylene and ethylene in multiple reactors using high activity Ti/Al catalysts is provided. The improvement consists of developing a control parameter derived from eight integral regions of the copolymer $^{13}$C NMR spectrum, defining the limits of the control parameter for the process, and operating the process to maintain the parameter within the defined limits. This is accomplished by adjusting the amount of ethylene in the primary and/or secondary reactor and adjusting other process variables as required.

27 Claims, 4 Drawing Sheets

PROCESS FOR CONTROLLING THE POLYMERIZATION OF PROPYLENE AND ETHYLENE AND COPOLYMER PRODUCTS

CROSS REFERENCE TO RELATED APPLICATION

This is a continuation of U.S. Pat. Ser. No. 07/975,487, filed Nov. 12, 1992, now abandoned.

BACKGROUND OF THE INVENTION

1. Field of the Invention

The present invention relates to an improved gas-phase copolymerization process for producing polymers of propylene and ethylene in multiple reactors using high activity Ti/Al catalyst systems whereby polymerization conditions are controlled through the use of control parameters. By monitoring the copolymer produced, ethylene feeds to either or both reactors and other process conditions are controlled and maintained within a specified range to produce copolymers having improved properties.

2. Description of the Prior Art

Copolymers of propylene and ethylene obtained utilizing Ziegler-Natta catalysts have been described in the prior art. U.S. Pat. No. 4,260,710 describes a process for producing propylene homopolymers and copolymers of propylene with other α-olefins utilizing Ziegler-Natta catalysts in a stirred vessel using catalyst components which can include a titanium halide and an aluminum alkyl.

U.S. Pat. Nos. 4,454,299 and 4,455,405 describe processes for the preparation of block copolymers of propylene and ethylene in two reaction zones using Ziegler-Natta catalysts. In these processes, propylene is first polymerized in gas form in an initial reaction zone and the resulting homopolymer is then transferred to a second reactor where a mixture of ethylene and propylene are polymerized therewith.

In U.S. Pat. No. 4,547,552 a process is disclosed to produce chemically blended propylene polymer compositions having ethylene contents from 3 to 40 weight percent. The process comprises polymerizing propylene in a first stage with 0 to 5 mol percent of another olefin and, in a second stage, polymerizing propylene and ethylene or propylene, ethylene and another olefin in the presence of the reaction product from the first step. Rubbery propylene copolymer and crystalline ethylene polymer or copolymer are produced in this manner.

U.S. Pat. No. 4,882,380 describes a gas-phase polymerization to produce products having an ethylene-propylene copolymer incorporated in a propylene homopolymer or copolymer matrix. This is accomplished by contacting propylene or another α-olefin in a first reactor using the prescribed catalyst and then passing the mixture to a second reactor where ethylene and propylene are polymerized to provide an ethylene-propylene copolymer.

Whereas all of the aforementioned processes provide useful polymers, the polymer properties may be deficient in some respects. It would highly advantageous if a process were available whereby polymerization conditions could be controlled to permit broadening the property envelope of the propylene-ethylene copolymers and to eliminate some of the problems associated with heretofore known procedures. These and other advantages are realized with the present improved process.

SUMMARY OF THE INVENTION

The present process utilizes two reactors for the polymerization of propylene and ethylene to produce copolymers. In one highly useful embodiment of the invention, the polymerizations are carried out in the gas phase using fixed bed stirred reactors. In a first reactor propylene is copolymerized with a minor amount of ethylene at 50° C. to 100° C. and 250 psig to 650 psig using a titanium catalyst and an organoaluminum cocatalyst. The copolymer product produced in the first reactor is then fed to a second reactor where additional propylene and ethylene are copolymerized at 25° C. to 80° C. and 100 psig to 500 psig. The amount of ethylene employed in the second reactor is different than employed in the first reactor.

The improvement of the present invention which permits the preparation of copolymers having improved flexibility and physical properties is the ability to independently control and balance conditions in the first and second reactors. This is accomplished by calculating a control parameter, $Q_c$, using the integrated peak areas of specified regions of the $^{13}C$ NMR spectrum for these copolymers and controlling the amount of ethylene fed to the primary and/or secondary reactors to maintain the value of the parameter within a defined range. This is conveniently achieved by monitoring the product produced, i.e., the copolymer obtained from the second reactor, and comparing the actual value obtained for the product, $Q_A$, with the control parameter or, more specifically, the limits defined therefor.

In a preferred embodiment of the invention, the control parameter $Q_c$ is derived from eight integral regions of the $^{13}C$ NMR spectrum as follows:

$$Q_c = A/B$$

where $A = 1.167R_1 + 0.75R_2 + 1.5R_3 + 1.5R_4 + 1.167R_8$ $B = 0.667R_1 + 0.5R_2 + R_5 + R_6 + R_7 + 0.667R_8$ and $R_1$ through $R_8$ have the following peak assignments $R_1$ 37.9 PPM
$R_2$ 37.5 PPM
$R_3$ 33.2 PPM
$R_4$ 31.2—30.9 PPM
$R_5$ 30.4 PPM
$R_6$ 30.0 PPM
$R_7$ 27.4 PPM
$R_8$ 24.9 PPM and the process conditions are maintained so that, $Q_A$, the value of the product being produced, is from 0.90 to 1.35 and, more preferably, from 0.95 to 1.30.

Copolymers containing from 53 to 97 weight percent propylene and 3 to 47 weight percent ethylene and having values for Q in the range 0.90–1.35 are also disclosed. Preferred copolymers will have flexural modulus from 40,000 psi to 70,000 psi.

DETAILED DESCRIPTION OF THE INVENTION

Figure 1:
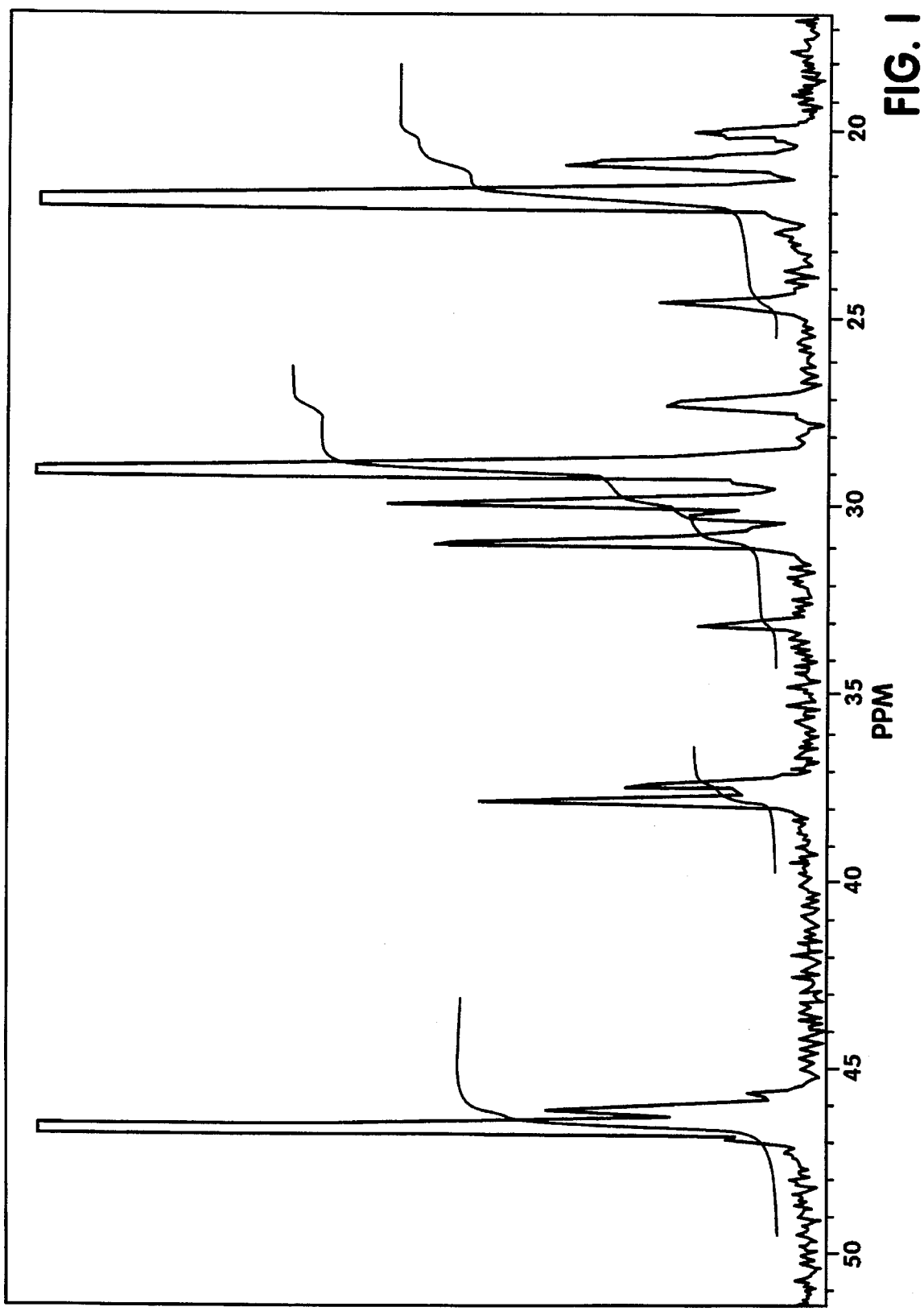
FIG. 1 is the $^{13}C$ NMR spectrum for a propylene-ethylene copolymer produced in accordance with the invention showing the integrated peak areas.

The present invention relates to an improved process for the polymerization of propylene and ethylene to produce copolymers having expanded property envelopes, most notably improved flexibility and physical properties. The process utilizes dual reactors connected in series for the polymerization. Whereas it is most advantageous to conduct both polymerizations in the gas phase, either the first or second reactor may be operated in a mode other than gas phase. For example, the copolymer produced in the first reactor may be obtained using a liquid pool or slurry polymerization.

In a first reactor, propylene is copolymerized with a minor amount of ethylene at a temperature from 50° C. to 100° C. and pressure from 250 psig to 650 psig utilizing a titanium catalyst and an organoaluminum cocatalyst. More preferably, the temperature in the first reactor will be from 50° C. to 90° C. and the pressure will range from 300 psig to 450 psig. The amount of ethylene used will range from 0.5 to 12 weight percent and, more preferably, from 3 to 10 weight percent.

The semi-crystalline copolymer of propylene and ethylene produced in the first reactor, referred to herein as the first copolymer, is directly fed to a second reactor which is maintained at 25° C. to 80° C. and 100 psig to 500 psig where additional propylene and ethylene are copolymerized in the presence of the first copolymer. The amount of ethylene employed in the second reactor is higher than employed in the first reactor in order to produce a copolymer of propylene and ethylene with rubber-like characteristics. Ethylene levels from 2.5 to 35 weight percent and, more preferably, from 5 to 30 weight percent are employed. Polymerization in the second reactor is generally accomplished without additional catalyst; however, it may be advantageous, to introduce more catalyst to the second reactor. If more catalyst is employed, it can be the same as the catalyst used in the first polymerization or different. Preferably, the second polymerization reactor is operated at 40° C. to 70° C. and 100 psig to 350 psig.

The use of dual or cascading reactors for the copolymerization of propylene and ethylene is known. Similarly, gas-phase polymerizations utilizing stirred, fixed beds comprised of small polymer particles are also known. For additional information regarding gas-phase polymerizations and a schematic flow diagram of the process, reference may be made to the article by Ross, et al., in *Ind. Eng. Chem. Prod. Res. Dev.*, 1985, 24: 149–154.

Highly active titanium catalyst activated by contact with an organoaluminum cocatalyst is utilized to produce polymer particles for these polymerizations. They are carried out in the substantial absence of liquid reaction medium and gas velocity within the stirred-bed is maintained below the onset of fluidization. Depending on their compositional makeup, gases can be recirculated through external heat exchangers for cooling or they can be partially condensed. Cooled monomer is recirculated into the reactor and provides thermal control. The recirculated monomer vaporizes when it is introduced into the reactor so that polymerization occurs in the gas phase. In the preferred mode of operation, i.e., stirred, fixed bed gas phase, the first and second reactors are fitted with spiral agitators to maintain a turbulent mechanically fluidized bed of polymer powder and prevent agglomeration.

Each reactor typically has its own control system(s) and is capable of independent operation. In the usual conduct of the process, propylene and ethylene monomers are passed through desiccant beds prior to injection into the reactor. Means are provided to individually meter the propylene, ethylene, hydrogen for molecular weight control, catalyst and cocatalyst. This makes it possible to more readily control and maintain the desired reactor conditions. If desired, monomer may be injected into the recirculated gas stream for introduction into the system. Suitable controls are also provided to vary the pressure, temperature and compositional analysis to facilitate maintaining a constant environment in the reactor and/or to permit adjustment of conditions to bring the system into conformance. Residence times in both reactors are on the order of 1 to 2 hours.

Semi-crystalline copolymer produced in the first reactor is introduced into a second reactor. This is facilitated by operating the primary reactor at a somewhat higher pressure than that maintained in the secondary reactor. Propylene, ethylene and hydrogen, as required, are metered into the second reactor so that ethylene and propylene are copolymerized in intimate admixture with the first copolymer. In usual practice, there is sufficient catalyst present with the first polymer to bring about polymerization in the second reactor and no further catalyst addition is required. Under certain circumstances, however, it may be advantageous to add additional catalyst/cocatalyst which can be the same or different as that used in the first reactor.

The final copolymer product which is an intimate mixture of the semi-crystalline propylene-ethylene copolymer produced in the first reactor and rubber-like copolymer produced in the second reactor, is discharged into a pressure letdown vessel where low pressure recycle gas consisting largely of unreacted monomers is volatilized for recycling. The copolymer can be processed to incorporate one or more additives and, if desired, pelletized. It is typically not necessary that the polymer exiting the second reactor be processed in a catalyst deactivation unit; however, for applications where extremely low levels of catalysts are required, this may be done.

Ethylene content of the copolymers can range from 3 up to about 47 weight percent. More typically the total ethylene will be from 8 to 40 weight percent. If desired, other α-olefins containing from 4 to 8 carbon atoms can be included in the polymerization and incorporated into the copolymers. Butene-1, pentene-1 and octene-1 are useful comonomers for this purpose. In an especially useful embodiment of the invention, the copolymer is comprised of 80 to 91 weight percent propylene and 9 to 21 weight percent ethylene.

Hydrogen is generally included in both reactors for control of molecular weight. The amount of hydrogen can range from 0.1 up to about 10 mole percent. More typically, hydrogen levels range from 0.1 to 5 mole percent in the primary reactor and from 1 to 10 mole percent in the secondary reactor.

Small amounts of known modifiers or inhibitors may also be included in these polymerizations. These can include compounds such as oxygen, carbon monoxide, carbon dioxide, sulfur dioxide, glycol ethers, aliphatic and aromatic alcohols, carboxylic acids, sulfonic acids, water, and primary or secondary amines. The use of compounds of this type are disclosed in U.S. Pat. No. 4,739,015 and European Pat. Application 86308952.0, published Jun. 10, 1987, Publication No. 0225099 and reference may be had thereto for additional detail.

To effect polymerization of propylene and ethylene, a high activity Ziegler-Natta catalyst comprised of a titanium-containing catalyst component and organoaluminum cocatalyst component is necessarily employed. Such catalysts are known and are referred to herein as Ti/Al catalysts. These may include additional components, such as a support, modifying compound(s), magnesium and other metal compound(s), electron donating compound(s), and the like.

Ti/Al catalyst systems utilized for the present process may be unsupported or they may be associated with conventional support materials. When supported, the support may be treated prior to incorporation of the titanium component. Conventional inorganic materials, such as silica, alumina, magnesium chloride, magnesium oxide, magnesium hydroxide and the like, can be used as supports.

Titanium compounds used generally correspond to the formula $Ti(OR)_nX_m$ where R is aryl and/or alkyl, X is halogen, n is 1 to 4, m is 0 to 3 with the proviso that m+n =4. Illustrative titanium compounds include: tetracresyl titanate, titanium tetrabutoxide, titanium tetranonolate, tetra 2-ethylhexyltitanate, tetra isobutyltitanate, tetra n-propyltitanate, tetra isopropyltitanate, titanium tetrachloride, titanium tetrabromide, methoxytitanium trichloride, ethoxytitanium trichloride, diethoxytitanium dichloride and the like. Trivalent compounds of titanium, such as titanium tribromide and titanium trichloride, may also be utilized.

Examples of useful magnesium compounds which can be used in the preparation of the catalysts include: magnesium oxide, magnesium hydroxide, hydrotalcite, carboxylic acid salts of magnesium, alkoxy magnesiums, aryloxy magnesiums, alkoxy magnesium halides, aryloxy magnesium halides, magnesium dihalides, organomagnesium compounds and the like. Magnesium chloride ($MgCl_2$) is widely used for the preparation of useful catalysts for polymerizing propylene and ethylene.

Representative electron donors include: ethers, alcohols, esters, aldehydes, aliphatic (fatty) acids, aromatic acids, ketones, nitriles, amines, amides, urea, thiourea, isocyanates, azo compounds, phosphines, phosphites, thioethers, thioalcohols, etc. Specifically, there can be mentioned diethyl ether, di-n-butyl ether, diphenyl ether, ethylene glycol monomethyl ether, diethylene glycol dimethyl ether, methanol, ethanol, propanol, ethyl acetate, vinyl acetate, acetaldehyde, benzaldehyde, acetic acid, propionic acid, succinic acid, acrylic acid, benzoic acid, methyl ethyl ketone, benzophenone, acetonitrile, diethylamine, tributylamine, triethylphosphine, triphenylphosphine oxide, and triethylphosphite.

The organoaluminum cocatalyst is usually an alkylaluminum or alkylaluminum halide and can include: trimethylaluminum, triethylaluminum, tri-n-propylaluminum, tri-n-butylaluminum, tri-i-butylaluminum, tri-n-hexylaluminum, tri-2-methylpentylaluminum, tri-n-octylaluminum, diethylaluminum monochloride, di-n-propylaluminum monochloride, di-i-butylaluminum monochloride, diethylaluminum monobromide, diethylaluminum monoiodide, diethylaluminum hydride, methylaluminum sesquichloride, ethylaluminum sesquichloride, ethylaluminum dichloride, and i-butylaluminum dichloride. Mixtures of these organoaluminum compounds can also be advantageously employed.

In addition to the foregoing, other compounds may be used in the preparation of catalysts useful for gas-phase polymerization of propylene and ethylene. These compounds serve different functions and, in some cases, they may be multi-functional. They may act as activators or modifiers for the titanium compound or support or may themselves have catalytic or cocatalytic activity. Examples of such compounds include: silicon halides, such as silicon tetrachloride; boron halides, such as boron trichloride; silanes, such as hexyltrimethoxysilane, amyltriethoxysilane, isobutyltrimethoxysilane, trichlorosilane, dichlorosilane and dibromosilane; hexaalkyl disilazanes, such as hexamethyl disilazane; and vanadium compounds, such as vanadium oxychloride and vanadium tetrachloride.

Ti/Al catalysts used for the gas-phase process of the invention are high activity catalysts, that is, they are capable of producing more than 5000 grams copolymer per gram of catalyst. In a more preferred embodiment, Ti/Al catalysts capable of producing 7000 grams or more copolymer per gram of catalyst are used. The amount of titanium catalyst used with supported catalysts is generally such that residual Ti contents in the copolymer are less than 10 ppm and, more preferably, below 5 ppm. With unsupported Ti/Al catalysts, the amount of catalyst used is such that residual Ti is less than 55 ppm and, more preferably, less than 40 ppm. Useful Ti/Al catalysts which can be employed for the process are described in U.S. Pat. Nos. 4,260,710; 4,309,521; 4,454,299; 4,547,552; 4,739,015; 4,814,377; 4,820,775 and 5,037,789.

In a particularly useful embodiment, highly active supported Ti/Al catalysts wherein the support is treated to remove or react surface hydroxyl groups prior to contacting with the titanium-containing compound are employed. Such pre-treatment or reaction of the support with a variety of materials makes it possible to produce catalyst which possess high activity for the polymerization of olefins in gas-phase processes. Such catalysts and their use for the homopolymerization of propylene are described in U.S. Pat. Nos. 4,950,631; 5,034,365; 5,051,388; 5,104,949 and 5,143,883.

One preferred supported catalysts of the above type useful for the preparation of the propylene-ethylene copolymers in accordance with the invention, referred to as embodiment I, is obtained by: (a) treating silica to remove surface hydroxyl groups by calcining said silica in an inert atmosphere and treating with a hexaalkyl disilazane; (b) contacting said treated silica with (1) a modifying compound selected from the group consisting of silicon halides, boron halides, aluminum halides, alkyl silicon halides and mixtures thereof; and (2) at least one hydrocarbon soluble magnesium-containing compound selected from the group consisting of hydrocarbyloxy magnesiums, hydrocarbyloxymagnesium halides and mixtures thereof; said contacting steps (1) and (2) occurring in random order; (c) contacting said product of step (b) with at least one titanium-containing compound having the structural formula $Ti(OR)_nX_m$, where R is aryl, alkyl or mixtures thereof; X is halogen; n is an integer of 1 to 4; m is 0 or an integer of 1 to 3; and the sum of m and n is 4; and (d) treating the product of step (c) with a titanium-containing compound having the structural formula $TiX^1_p(OR^1)_q$, where $X^1$ is halogen; $R^1$ is aryl or alkyl; p is an integer 1 to 4; q is 0 or an integer of 1 to 3; and the sum of p and q is 4, with the proviso that the titanium-containing compound of this step is not the same as the titanium-containing compound of step (c). Supported catalysts of this type are described in U.S. Pat. No. 4,950,631 which is incorporated herein by reference.

In another preferred embodiment (embodiment II), the catalyst is obtained by treating silica to remove surface hydroxyl groups by calcining in an inert atmosphere and treating with a hexaalkyl disilazane and reacting said modified silica support having a selective distribution of reactive hydroxyl groups with a magnesium compound reactive with said surface hydroxyl groups, optionally reacting the thus obtained product with a silicon halide, alkyl silicon halide, boron halide or aluminum halide, further reacting the so-produced first material with a tetra-substituted organo halogen-free titanium compound wherein the organic moiety sterically hinders accessibility of said organo titanium compound to the reactive sites on the modified silica support and thereafter reacting the so-produced second material with a titanium halide. Such catalysts are described in U.S. Pat. No. 5,143,883 which is incorporated herein by reference.

For yet another preferred embodiment (embodiment III), the catalyst is prepared by (a) contacting silica, in random order, with (1) at least one hydrocarbon soluble magnesium-containing compound; and (2) a first modifying compound selected from the group consisting of silicon halide; boron halides, aluminum halides and mixtures thereof followed by a second modifying compound selected from the group consisting of a silane of the formula $SiH_rX^2_s$, where $X^2$ is halogen; r is an integer of 1 to 3; and s is an integer of 1 to 3, with the proviso that the sum of r and s is 4, hydrogen halides having the structural formula $HX^3$, where $X^3$ is halogen, and mixtures thereof, said sequence of contact of silica with said components (1) and (2) being random; (b) contacting the product of step (a) with a first titanium-containing compound having the structural formula $Ti(OR)_mX_n$, where R is hydrocarbyl or cresyl; X is halogen; m is an integer of 1 to 4; and n is 0 or an integer of 1 to 3, with the proviso that the sum of m and n is 4; and (c) contacting the product of step (b) with a second titanium-containing compound having the structural formula $TiX^1_p(OR^1)_q$, where $X^1$ is halogen; $R^1$ is hydrocarbyl; p is an integer of 1 to 4; q is 0 or an integer of 1 to 3, with the provisos that the sum of p and q is 4 and that said first titanium-containing compound and said second titanium-containing compound are different. Catalysts of this type are described in U.S. Pat. No. 5,034,365 which is incorporated herein by reference.

For another preferred embodiment (embodiment IV), a highly useful catalyst is produced by (a) treating an inert inorganic support with hexamethyl disilazane to remove surface hydroxyl group and heating at 100°–150° C. for ½ to 3 hours; (b) contacting said treated inert inorganic support with a hydrocarbon soluble magnesium compound; (c) contacting said product of said step (b) with a modifying compound selected from the group consisting of silicon halides, boron halides, aluminum halides, hexaalkyl disilazanes and mixtures thereof; (d) contacting said product of said step (c) with a vanadium compound having the structural formula $V(O)_2X^1_{4-s}$, where $X^1$ is halogen; and s is 0 or 1; a first titanium-containing compound having the structural formula $TiX^3_p(OR^3)$ where $X^3$ is halogen; $R^3$ is hydrocarbyl; p is an integer of 1 to 4; and q is 0 or an integer of 1 to 3, with the proviso that the sum of p and q are 4 and, optionally, a second titanium-containing compound of the formula $Ti(OR^2)_nX_m$, where $R^2$ is hydrocarbyl; $X^2$ is halogen; n is an integer of 1 to 4; and m is 0 or an integer of 1 to 3 with the proviso that the sum of n and m is 4; and with the further proviso that if two titanium-containing compounds are used said first and said second titanium-containing compounds are not identical. These catalysts are described in U.S. Pat. No. 5,051,388 which is incorporated herein by reference.

A final preferred embodiment (embodiment V) utilizes a catalyst component obtained by (a) heating an inert inorganic support to a temperature of 100°–150° C. for ½ to 3 hours to remove surface hydroxyl groups; (b) contacting the treated inert inorganic compound with a hydrocarbon soluble magnesium compound; (c) contacting the product of said step (b) with a modifying compound selected from the group consisting of silicon halides, boron halides, aluminum halides, alkyl silicon halides, hexaalkyl disilazanes and mixtures thereof; and (d) contacting the product of said step (c) with a vanadium compound having the structural formula $V(O_2)X^1_{4-s}$, is halogen and s is 0 or 1; a first titanium-containing compound having the structural formula $TiX^3_p(OR^3)_q$, where $X^3$ is halogen, $R^3$ is hydrocarbyl, p is an integer of 1 to 4, and q is 0 or an integer of 1 to 3, with the proviso that the sum of p and q are 4 and, optionally, a second titanium-containing compound of the formula $Ti(OR^2)_nX^2_m$, where $R^2$ is hydrocarbyl, $X^2$ is halogen, n is an integer of 1 to 4, and m is 0 or an integer of 1 to 3 with the proviso that the sum of n and m is 4; and with the further proviso that if two titanium-containing compounds are used said first and said second titanium-containing compounds are not identical. The catalysts of this preferred embodiment are disclosed in U.S. Pat. No. 5,104,949 which is incorporated herein by reference.

All of the supported titanium catalyst components of the aforementioned preferred embodiments I–V are utilized with one or more cocatalysts in the polymerization process. At least one cocatalytic agent which is an organoaluminum compound and, more preferably, an aluminum alkyl or alkylaluminum halide is combined with the titanium component. Further advantages are realized with certain of titanium components if a second cocatalyst silane component is also present. Useful silanes are hydrocarbylalkoxysilanes and have the general formula $R'_a(OR'')_{4-a}$ Si where R' and R" are the same or different hydrocarbyl groups.

Gas-phase stirred bed polymerizations processes are recognized for their reliability and ability be operated continuously for extended periods to produce large volumes of polymer. Because of the extended residence times for these processes, feed forward control is widely practiced to control reactor variables. However, as one or more of the process variables are controlled or adjusted to alter a particular property, this often has adverse affect on one or more of the other essential properties. With the present invention, it is now possible through the use of a derived parameter to control/adjust conditions in the primary and/or secondary reactors in a manner so that an improved balance of polymer properties and expanded property envelope can be obtained. In a particularly advantageous embodiment, propylene-ethylene copolymers having improved flexibility and physical properties are produced. Furthermore, it is possible to produce these improvements in a consistent manner. It is further possible with the present invention, after achieving conditions in the process which produce an optimum balance of properties, to maintain this balance of properties by making adjustments to compensate for unanticipated fluctuations in the system.

Control of the process is accomplished by developing a control parameter, referred to as $Q_c$, based on selected integrated peak areas of the $^{13}C$ NMR spectrum for propylene-ethylene copolymers and acceptable limits are defined therefor. The product produced in the second reactor is analyzed and the actual value obtained for the product, referred to as $Q_A$, compared with the control parameter to determine conformance/nonconformance. Adjustments are made, as required, to the ethylene feed and, if necessary, other process variables to bring the $Q_A$ into conformance with the limits defined for $Q_c$.

It will be understood by those skilled in the art that, if the overall (total) pressure in the reactor(s) is maintained at the same level, any change in ethylene pressure resulting from adjustments to the ethylene feed in response to the $Q_c$ will require a corresponding change in one or more of the other components present in the gas phase. A change in the partial pressure of ethylene will necessarily change the partial pressure of propylene, hydrogen and any other gas phase components at constant total pressure. The total pressure in the reactor may, on the other hand, be changed in response to changes in the amount of ethylene fed so that the partial pressures at the other gaseous components will remain unchanged.

A number of control parameters may be developed depending on the particular $^{13}$C NMR peak areas used and the particular algorithm used to calculate the control. In general, however, the control parameter(s) used will be derived using all or some combination of the following $^{13}$C NMR peaks for solutions of ethylene-propylene copolymers and generally accepted by the scientific and technical communities as corresponding to molecular structural features of these copolymers:

| CHEMICAL SHIFT (PPM) | | ASSIGNMENT |
|---|---|---|
| 45.6–47.5 | $S_{\alpha\alpha}$ | [CH$_2$ of PPP Triads] |
| 37.9 | $S_{\alpha\gamma}$ | [CH$_2$ in PEP] |
| 37.5 | $S_{\alpha\delta^+}$ | [CH$_2$ in EEEP and PEEP] |
| 33.2 | $T_{\gamma\gamma^+}$ | [CH in EPE] |
| 31.2–30.9 | $T_{\beta\gamma^+}$ | [CH in PPE] |
| 30.4 | $S_{\gamma\delta^+}$ | [CH$_2$ in PEEP] |
| 30.0 | $S_{\delta\delta^+}$ | [CH$_2$ in EEEE] |
| 29.0–28.4 | $T_{\beta\beta}$ | [CH in PPP] |
| 27.4 | $S_{\beta\gamma^+}$ | [CH$_2$ in EEEP and PEEP] |
| 24.9 | $S_{\beta\beta}$ | [CH$_2$ in PEP] |
| 21.6–19.5 | P | [CH$_3$ in all P Triads] |

The eleven $^{13}$C NMR peaks listed above have been widely used in the literature to calculate sequential distributions of the six theoretically possible triads, three dyads, and the overall compositions of these copolymers. Details regarding the use of these $^{13}$C NMR peak areas for the calculation of composition and monomer sequence distributions in copolymers and problems associated with the resolution and determination thereof are available in the text of J. C. Randall, *Polymer Sequence Determination*, Academic Press (1977) or the paper by the same author in *JMS—Rev. Macromol Chem. Phys.*, C29 (2 and 3), 201–317 (1989). Whereas the various methods described by Randall involve the addition and subtraction of numerous peak areas which can result in the summation of errors, the method of the invention uses fewer peaks. Determinations will, of course, depend on the accuracy of the individual integrals and resolution of the peaks in the spectrum.

In one highly useful embodiment of the invention, one or more control parameters derived from eight of the above-identified peak areas, identified as $R_1$–$R_8$, are utilized. The peaks $R_1$ through $R_8$ correspond to the following chemical shifts: $R_1$ 37.9 PPM; $R_2$ 37.5 PPM; $R_3$ 33.2 PPM; $R_4$ 31.2-30.9 PPM; $R_5$ 30.4 PPM; $R_6$ 30.0 PPM; $R_7$ 27.4 PPM and $R_8$ 24.9 PPM. In identifying and resolving the aforementioned peak areas, the methyl peak due to isotactic PPPPP pentads is used as a chemical shift reference line and is set to 21.78 PPM.

In another highly useful and preferred embodiment of the invention, the control parameter $Q_c$ is derived from the eight integral regions of the $^{13}$C NMR spectrum in accordance with the equation $$Q_c = A/B$$

wherein $A = 1.167R_1 + 0.75R_2 + 1.5R_3 + 1.5R_4 + 1.167R_8$ $B = 0.667R_1 + 0.5R_2 + R_5 + R_6 + R_7 + 0.667R_8$ where $R_1$ through $R_8$ correspond to the previously identified peak areas. When $Q_c$ conforms to the above definition, the defined limits for $Q_c$ in the process will range from 0.90 to 1.35 and, more preferably, from 0.95 to 1.30. In the event the actual value $Q_A$ obtained drops below the 0.90 minimum limit, the ethylene feed to the primary reactor would be increased and/or the ethylene feed to the secondary reactor would be decreased. Adjusting the ethylene feed will change the ratio of the partial pressures of the gaseous components in the reactor. Other process conditions and feed rates may but are not necessarily changed to bring the system, i.e., process and copolymer composition, into conformance. When $Q_A$ exceeds the maximum permissible limit of 1.35, the ethylene feed to the primary reactor would be reduced and/or the ethylene feed to the secondary reactor would be increased.

Whereas $Q_c$ is by itself a convenient and highly useful parameter for controlling the reaction conditions in the primary and secondary reactors, it may also be utilized in conjunction with other parameters obtained using other combinations of the characteristic $^{13}$C NMR peaks. Use of the control parameter $Q_c$ and any of the other calculated parameters related thereto is useful because they do not require a prior knowledge of the amount and composition of polymer produced in the primary reactor. It will be appreciated by those skilled in the art that if comonomers other than ethylene are employed, peak assignments will have to be modified to correspond to the analogous structural features. For propylene-butene-1 copolymers, for example, the structural features for ethyl groups rather than methyl groups will be used.

In addition to being used to control polymerization conditions, the defined parameters also describe and distinguish subtle differences in the properties of the copolymers. An illustration of the control of polymer properties includes the ability to obtain improved impact properties at temperatures as low as –40° C. and –50° C. at high rubber contents. Also, the process makes it possible to widely vary flexural modulus by judicious choice of catalyst and primary and secondary reactor conditions. In this manner, the stiffness/impact balance can be readily tailored to meet the specific needs of an end-user's application. Using this process, it is also possible to obtain highly desirable dispersion of the rubber phase so that improved levels of heat distortion temperatures can be obtained. Even with materials having relatively high rubber contents only modest changes in heat deflection temperatures occur.

To better understand the operation of the process and to demonstrate the improved balance of copolymer properties obtained therewith, the following detailed example is provided for illustration. Parts and percentages are on a weight basis unless otherwise indicated.

EXAMPLE

Preparation of Titanium Catalyst Component

Thirty pounds hexamethyl disilazane-treated silica (Crosfield EP-10) containing 4% carbon by analysis on silica was charged to a vessel and heated for 8 hours with a nitrogen purge while heating at a temperature of 138°–149° C. The treated silica was cooled to 26.5° C. under 30 psi $N_2$ and 89 lbs 12 oz. 2-methyl-1-pentyloxymagnesium chloride added with stirring. The mixture was heated at 90.5° C. under a nitrogen purge for 2–3 hours and then cooled to 35° C. under 15 psi $N_2$. Heptane (150 lbs) and 65 lbs 4 oz. silicon tetrachloride solution (35 wt. % in heptane) were then added. The $SiCl_4$ was added at a rate of 10 lbs per 10 minutes. When the addition was complete, the mixture was heated to 48.9°–54.4° C. and maintained for 1 hour. The mixture was then cooled and the solids permitted to settle for 2 hours. The bulk of the liquid was siphoned off and 150 lbs fresh heptane added with stirring for 15 minutes. This mixture was permitted to settle for 2 hours and the siphoning repeated. Heptane (170 lbs) was again added while stirring followed by the addition of 19 lbs 1 oz. titanium cresylate solution (40% in heptane) and then 109 lbs titanium tetrachloride. The mixture was heated and maintained at 100°±12° C. for 2 hours. After cooling to below 88° C., 200 lbs heptane was added and agitation was stopped. The reactor was cooled to below 65° C. and the mixture allowed to settle for 2 hours. The liquid was siphoned off and 200 ml fresh heptane added followed by stirring for 15 minutes and 1 hour settling. This washing procedure was repeated 4 more times. The catalyst was then dried at 99°±12° C. with a nitrogen purge until all the heptane was removed. The product was analyzed by x-ray fluorescence and found to contain 2.28% Ti, 3.84% Mg, 46.8% Si and 15% Cl.

Polymerization of Propylene and Ethylene

Two conventional 800 liter gas-phase polymerization reactors, each equipped with a stirrer to maintain turbulent mechanical fluidization of the polymer powder within, were connected so that polymer exiting the first (primary) reactor was introduced into the second (secondary) reactor. Ethylene and propylene were continuously metered at controlled rates to the first reactor which was maintained at 76.5° C. and 350 psig. A hydrogen feed rate of 0.18 SCFH was maintained to the primary reactor and the titanium catalyst and two cocatalysts were also independently metered. The first cocatalyst was triethylaluminum which was introduced as a 25% solution in heptane. The second cocatalyst, isobutyltrimethoxysilane, was introduced as a 15% solution in heptane. The catalyst and cocatalyst agents were fed at rates to maintain a triethylaluminum/silane/titanium ratio of 120/16/1.

Ethylene and propylene were also continuously metered at controlled rates to the second reactor. The secondary reactor was operated at 51.6° C. and 200 psig. Hydrogen was metered at a rate of 5.45 SCFH. No catalyst or cocatalyst was added to the second reactor.

For this polymerization, a control value in the mid-range of the defined limits for the $Q_c$ parameter developed for propylene-ethylene copolymers was selected and the feed rates of propylene and ethylene into the primary and secondary reactors were maintained to achieve and maintain this selected control value. This mid-range value was selected to provide a copolymer with representative properties within the broader property envelope possible with the products. Specifically, ethylene was fed at a rate of 17 lbs/hr to the primary reactor and the feed rate of propylene into the primary reactor was 281 lbs/hr. The feed rates of propylene and ethylene to the secondary reactor were 32 lbs/hr and 31.5 lbs/hrs., respectively. Under these operating conditions the actual value, $Q_A$, obtained for the copolymer produced under steady state conditions was 1.14. This value was determined based on $^{13}C$ NMR analysis of the resulting copolymer product in accordance with the equation $Q=A/B$ where A and B and the peak areas $R_1$–$R_8$ utilized to obtain A and B are as previously defined. FIG. 1 shows the $^{13}C$ NMR spectrum obtained for the copolymer with the integrated peak areas.

Figure 2:
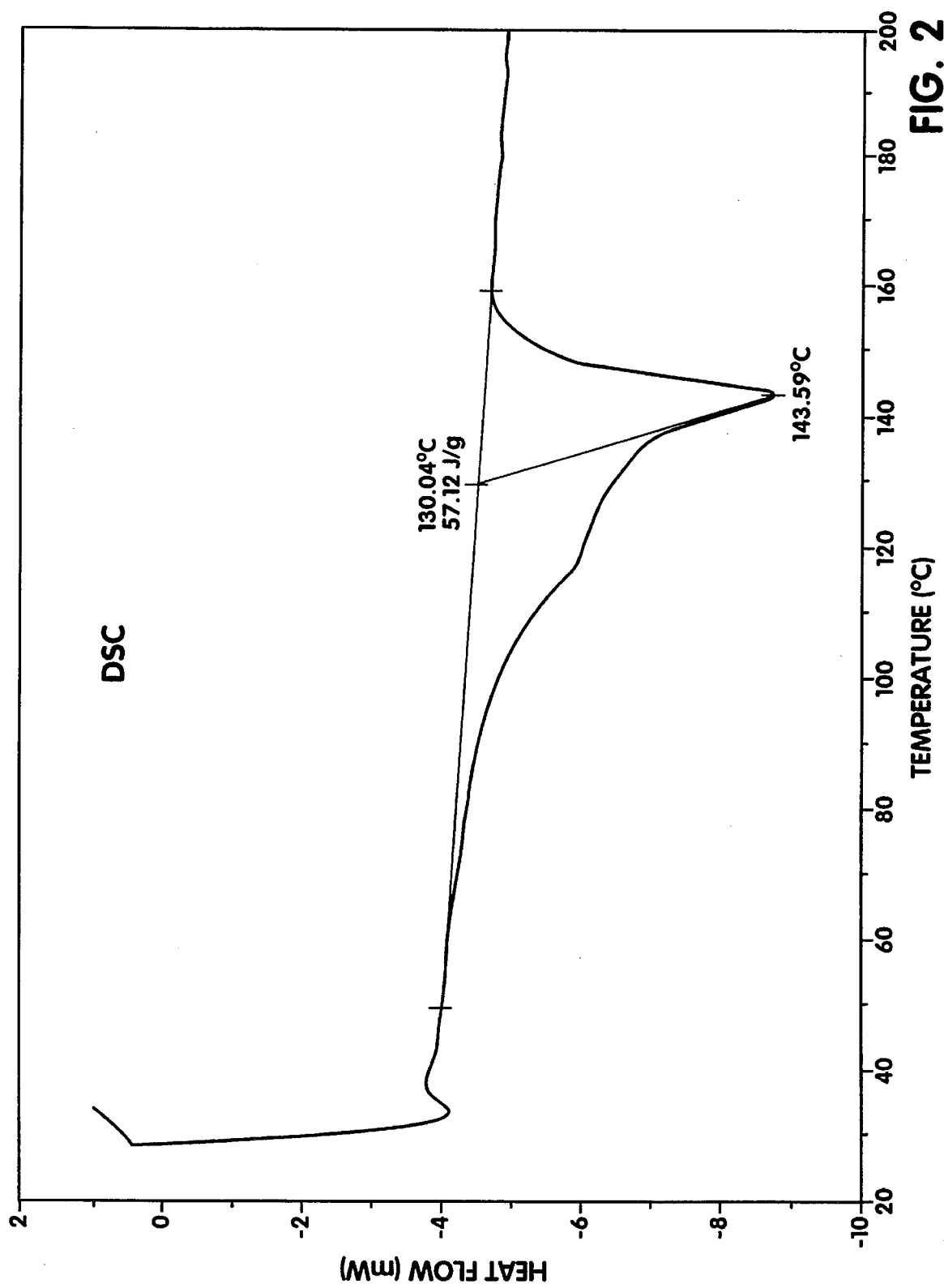
FIG. 2 is a DSC (Differential Scanning Calorimeter) Plot obtained for a propylene-ethylene copolymer produced in accordance with the invention and having a melting temperature of 143.59° C.

The copolymer produced was extruded and pelletized as it exited the secondary reactor. Additives were incorporated during the processing. Elemental analysis of the copolymer showed it to contain 3.5 ppm Ti; 272 ppm Al; 26 ppm Cl; 77 ppm Si; 100 ppm Ca; and 71 ppm P. The copolymer had a melt flow rate of 1.0 dg/min., DSC peak melt temperature of 143.6° C. and heat of fusion (DSC) of 13.67 cal/g. FIG. 2 shows the DSC profile obtained for the copolymer with only one peak at 143.6° C. The secondary peak usually observed with heretofore known copolymers of this type in the range 115°–125° C. is absent.

Figure 3:
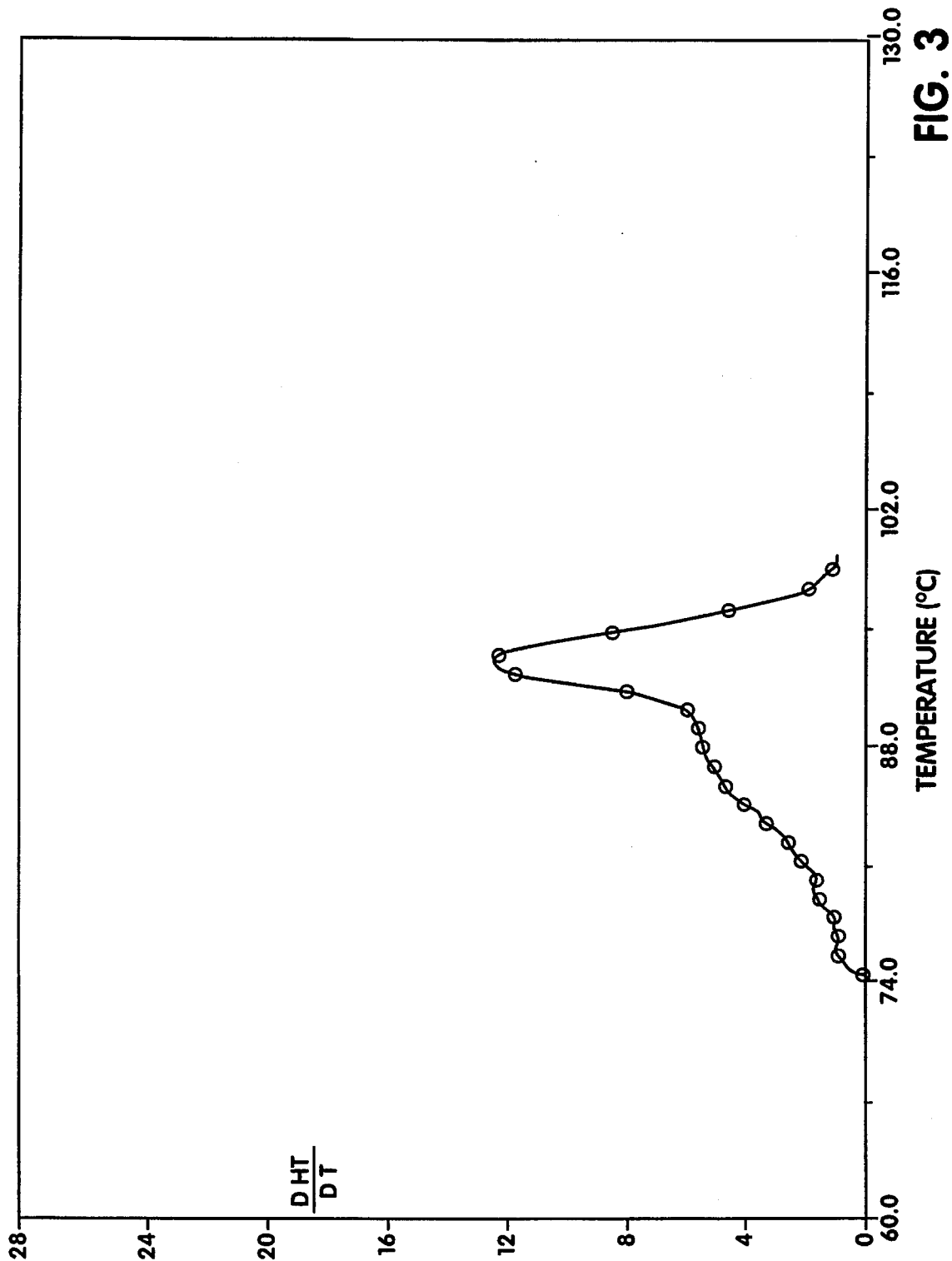
FIG. 3 is a plot of fractionation data obtained for a propylene-ethylene copolymer produced in accordance with the invention obtained by temperature rising elution fractionation (TREF). The ordinate is the output from the detector (DHT/DT) and the abscissa is the elution temperature.
Figure 4:
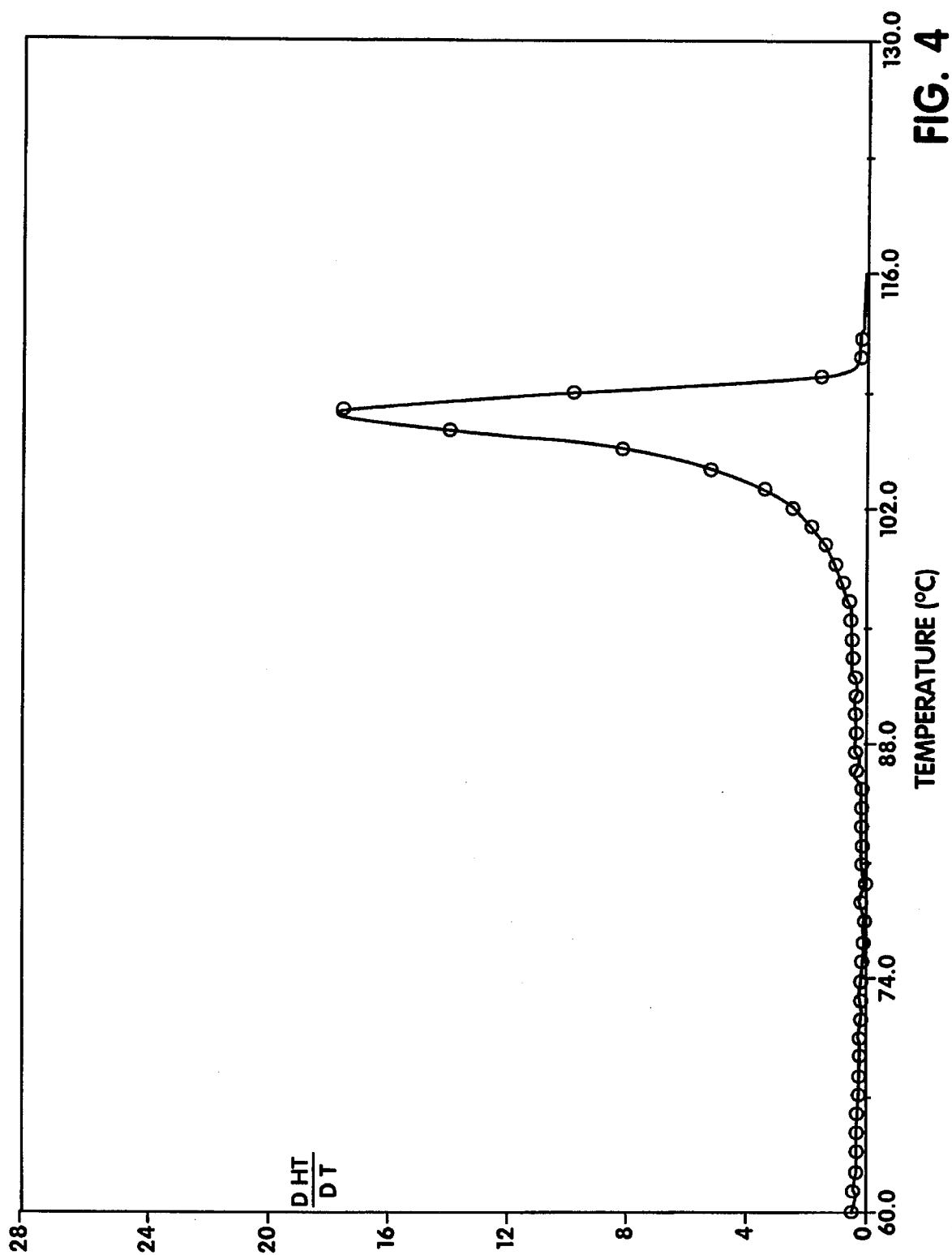
FIG. 4 is a plot of fractionation data obtained for a prior art impact copolymer obtained by temperature rising elution fractionation (TREF) presented for the purpose of comparison. The ordinate is the output from the detector (DHT/DT) and the abscissa is the elution temperature.

The copolymer was an intimate mixture of semi-crystalline random propylene-ethylene copolymer produced in the first reactor containing 3.5 percent ethylene and the rubber-like propylene-ethylene copolymer produced in the secondary reactor which contained 10 percent ethylene. The copolymer was fractionated using temperature rising elution fractionation (TREF), a recognized procedure for separating polymer species based on differences in crystallizability in accordance with the procedure of Wild, et al., (1992) *Development of High Performance TREF for Polyolefin Analysis; Proceeding of Am. Chem. Soc., Div. of Polym. Mat. Sci. and Eng.* 67:153. FIG. 3 is a plot of distribution data obtained for the propylene-ethylene copolymer. For comparison, a plot of the distribution obtained for a conventional impact copolymer produced using the conventional two-reactor gas-phase process and having a comparable ethylene content is presented in FIG. 4. The compositional dissimilarities of these copolymers are apparent from a comparison of the two curves.

Physical properties were determined for the propylene-ethylene copolymer produced above and were as follows:

| | |
|---|---|
| Tensile at yeild (psi) | 2314 |
| Elongation at yield (%) | 31 |
| Flexural Modulus (Mpsi) | 51.4 |
| Notched Izod, 23° C. (ft-lb/in) | 14.4 N.B. |
| Notched Izod, –18° C. (ft-lb/in) | 16.4 P |
| Notched Izod, –30° C. (ft-lb/in) | 1.4 |
| Unnotched Izod, –18° C. (ft-lb/in) | 34.2 N.B. |

Additionally, it was observed that the copolymers were resistant to bruise, i.e., stress whitening, on deformation.

It is apparent from the above data that propylene-ethylene copolymers produced in accordance with the process of the invention using a control value of 1.14 which is approximately in the middle of the defined $Q_c$ range have a useful balance of structural characteristics and physical properties. It is also apparent that the property envelope of these copolymers can be varied by selection of a different value within the range of values for $Q_c$ and by varying the ethylene feed to the polymerizations and, if necessary, other process conditions, to achieve and maintain the desired value during operation of the process. For example, to operate the system to obtain a value for $Q_A$ less than 1.14, the amount of ethylene to the first reactor would be reduced, the amount of ethylene in the second reactor would be increased or combination of the two would be used. If it was desired to increase the $Q_c$ target to a value greater than 1.14, adjustments would be made to increase the ethylene content in the primary reactor and/or decrease the amount of ethylene fed to the secondary reactor.

Copolymers produced in accordance with the present process have a desirable balance of properties but, most notably, have improved softness without adversely affecting other essential polymer characteristics. Such a balance of properties was heretofore not possible with reactor produced copolymers of propylene and ethylene. Whereas copolymers of this type, referred to as impact copolymers, have been widely produced using gas-phase multiple reactor technology, these products typically had flexural modulii between 75,000 and 230,000 psi. While these impact copolymers had excellent low temperature impact strength, their high flexural modulus prevented use in certain applications where products having lower stiffness were required. Furthermore, many of these high impact copolymers had a tendency to bruise or stress whiten upon impact.

With the process of this invention, copolymers of propylene and ethylene having reduced stiffness are produced. Flexural modulii from 100,000 to as low as 20,000 and, more preferably, from 40,000 to 70,000 psi are achieved. The copolymers also exhibit excellent see-through clarity and have improved resistance to bruise and stress whitening upon impact. A further advantage is that the useful copolymers are obtained directly from the reactor without the need for further processing or blending to achieve the desired stiffness/impact balance.

While it is not necessary, if desired the copolymers of the invention can be visbroken in accordance with known procedures to increase the melt flow rates of the products. This is typically accomplished by processing the copolymer at an elevated temperature in an extruder under high shear conditions and in the presence of peroxide. Peroxide levels used will generally range from 500 to 1800 ppm. In general, as the level of ethylene incorporation is increased, the amount of peroxide required to achieve a target melt flow rate must be increased. To illustrate the ability to change the melt flow rate of the copolymers without significantly affecting the other essential properties, the above-described propylene-ethylene copolymer having a melt flow rate of 1.0 was visbroken to nominal melt flow rates of 9 and 25. Properties of the two resulting visbroken products were as follows:

| Melt Flow Rate (dg/min) | 9.03 | 25.7 |
|---|---|---|
| Tensile at Yield (psi) | 1923 | 1724 |
| Elongation at Yield (%) | 16 | 16 |
| Flexural Modulus (Mpsi) | 48.3 | 37.3 |
| Notched Izod, 23° C. (ft-lb/in) | 13.4 N.B. | 12.5 N.B. |
| Notched Izod, −30° C. (ft-lb/in) | 1 | 1.2 |

The copolymers of the inventions can be utilized in most applications where conventional impact copolymers are employed. They may be used by themselves or blended with other polymers. The reduced stiffness of these copolymers makes them especially useful for films, particularly in light of their resistance to tear and puncture. Cast films having an average thickness of 1.35 mil were prepared using the copolymer and the film had the following properties:

| Tensile at Break (psi): | |
|---|---|
| MD | 5290 |
| TD | 3630 |
| Elongation at Break (%): | |
| MD | 520 |
| TD | 590 |
| 1% Secant Modulus (psi): | |
| MD | 35600 |
| TD | 27800 |
| Dart Drop Impact (g): | 1204 |
| Tear (g): | |
| MD | 270 |
| TD | 860 |

We claim:

1. In a gas-phase process for producing copolymers of propylene and ethylene in multiple reactors wherein propylene is copolymerized with a minor amount of ethylene in a first reactor maintained at 50° C. to 100° C. and 250 psig to 650 psig in the presence of a titanium catalyst and organoaluminum cocatalyst and the product produced therein is fed to a second reactor maintained at 25° C. to 80° C. and 100 psig to 500 psig where propylene is copolymerized with a minor amount of ethylene, to obtain copolymers having improved flexibility and physical properties, the improvement comprising (a) calculating a control parameter $Q_c$ using eight integrated areas of the $^{13}C$ NMR spectrum corresponding to molecular structural features for copolymers of propylene and ethylene in accordance with the equation $$Q_c = A/B$$

where
$A = 1.167R_1 + 0.75R_2 + 1.5R_3 + 1.5R_4 + 1.167R_8$
$B = 0.667R_1 + 0.5R_2 + R_5 + R_6 + R_7 + 0.667R_8$ and
$R_1$ through $R_8$ have the following peak assignments
$R_1$ 37.9 PPM
$R_2$ 37.5 PPM
$R_3$ 33.2 PPM
$R_4$ 31.2—30.9 PPM
$R_5$ 30.4 PPM
$R_6$ 30.0 PPM
$R_7$ 27.4 PPM
$R_8$ 24.9 PPM (b) selecting limits for $Q_c$ for the process within the range 0.90 to 1.35.

(c) determining the actual value of the parameter, $Q_A$, for the copolymer obtained from the second reactor; and (d) controlling the ethylene feed to maintain $Q_A$ within the limits selected in (b).

2. The process of claim 1 wherein one or more α-olefins containing from 4 to 8 carbon atoms are included in the polymerization.

3. The process of claim 1 wherein 0.5 to 12 wt. percent ethylene is present in the first reactor and 2.5 to 35 wt. percent ethylene is present in the second reactor.

4. The process of claim 3 wherein an amount of hydrogen ranging from 0.1 to 5 mol percent is included in the first reactor and an amount of hydrogen from 1 to 10 mol percent is included in the second reactor.

5. The process of claim 4 wherein polymerization in both the first and second reactors is a gas-phase polymerization, the reactors are stirred-bed reactors and the Ti/Al catalyst is a high activity supported Ti/Al catalyst.

6. The process of claim 5 wherein no additional catalyst is added to the second reactor.

7. The process of claim 5 wherein the support used for the high activity supported Ti/Al catalyst is treated to remove surface hydroxyl groups prior to contacting with the titanium-containing compound.

8. The process of claim 7 wherein the catalyst is obtained by (a) treating silica to remove surface hydroxyl groups by calcining said silica in an inert atmosphere and treating with a hexaalkyl disilazane; (b) contacting said treated silica with (1) a modifying compound selected from the group consisting of silicon halides, boron halides, aluminum halides, alkyl silicon halides and mixtures thereof; and (2) at least one hydrocarbon soluble magnesium-containing compound selected from the group consisting of hydrocarbyloxy magnesiums, hydrocarbyloxymagnesium halides and mixtures thereof; said contacting steps (1) and (2) occurring in random order; (c) contacting said product of step (b) with at least one titanium-containing compound having the structural formula Ti $(OR)_n X_m$, where R is aryl, alkyl or mixtures thereof; X is halogen; n is an integer of 1 to 4; m is 0 or an integer of 1 to 3; and the sum of m and n is 4; and (d) treating the product of step (c) with a titanium-containing compound having the structural formula $TiX^1_p(OR^1)_q$, where $X^1$ is halogen; $R^1$ is aryl or alkyl; p is an integer 1 to 4; q is 0 or an integer of 1 to 3; and the sum of p and q is 4, with the proviso that the titanium-containing compound of this step is not the same as the titanium-containing compound of step (c).

9. The process of claim 8 wherein an organoaluminum cocatalyst and an optional silane cocatalyst of the formula $R'_a(OR'')_{4-a}$ Si where R' and R'' are hydrocarbyl groups are present with the titanium catalyst.

10. The process of claim 7 wherein the catalyst is obtained by treating silica to remove surface hydroxyl groups by calcining in an inert atmosphere and treating with a hexaalkyl disilazane and reacting said modified silica support having a selective distribution of reactive hydroxyl groups with a magnesium compound reactive with said surface hydroxyl groups, optionally reacting the thus obtained product with a silicon halide, alkyl silicon halide, boron halide or aluminum halide, further reacting the so-produced first material with a tetra-substituted organo halogen-free titanium compound wherein the organic moiety sterically hinders accessibility of said organo titanium compound to the reactive sites on the modified silica support and thereafter reacting the so-produced second material with a titanium halide.

11. The process of claim 10 wherein an organoaluminum cocatalyst and an optional silane cocatalyst of the formula $R'_a(OR'')_{4-a}$ Si where R' and R'' are hydrocarbyl groups are present with the titanium catalyst.

12. The process of claim 7 wherein the catalyst is obtained by (a) contacting silica, in random order, with (1) at least one hydrocarbon soluble magnesium-containing compound; and (2) a first modifying compound selected from the group consisting of silicon halide; boron halides, aluminum halides and mixtures thereof followed by a second modifying compound selected from the group consisting of a silane of the formula $SiH_rX^2_s$ where $X^2$ is halogen; r is an integer of 1 to 3; and s is an integer of 1 to 3, with the proviso that the sum of r and s is 4, hydrogen halides having the structural formula $HX^3$, where $X^3$ is halogen, and mixtures thereof, said sequence of contact of silica with said components (1) and (2) being random; (b) contacting the product of step (a) with a first titanium-containing compound having the structural formula $Ti(OR)_m X_n$, where R is hydrocarbyl or cresyl; X is halogen; m is an integer of 1 to 4; and n is 0 or an integer of 1 to 3, with the proviso that the sum of m and n is 4; and (c) contacting the product of step (b) with a second titanium-containing compound having the structural formula $TiX^1_p(OR^1)_q$, where $X^1$ is halogen; $R^1$ is hydrocarbyl; p is an integer of 1 to 4; q is 0 or an integer of 1 to 3, with the provisos that the sum of p and q is 4 and that said first titanium-containing compound and said second titanium-containing compound are different.

13. The process of claim 12 wherein an organoaluminum cocatalyst and an optional silane cocatalyst of the formula $R'_a(OR'')_{4-a}$ Si where R' and R'' are hydrocarbyl groups are present with the titanium catalyst.

14. The process of claim 7 wherein the catalyst is obtained by (a) treating an inert inorganic support with hexamethyl disilazane to remove surface hydroxyl groups and heating at 100°–150° C. for ½ to 3 hours; (b) contacting the treated inert inorganic compound with a hydrocarbon soluble magnesium compound; (c) contacting the product of said step (b) with a modifying compound selected from the group consisting of silicon halides, boron halides, aluminum halides, alkyl silicon halides, hexaalkyl disilazanes and mixtures thereof; and (d) contacting the product of said step (c) with a vanadium compound having the structural formula $V(O_2)X^1_{4-s}$, where X is halogen and s is 0 or 1; a first titanium-containing compound having the structural formula $TiX^3_p(OR^3)_q$, where $X^3$ is halogen; $R^3$ is hydrocarbyl; p is an integer of 1 to 4; and q is 0 or an integer of 1 to 3, with the proviso that the sum of p and q are 4 and, optionally, a second titanium-containing compound of the formula $Ti(OR^2)_n X^2_m$ where $R^2$ is hydrocarbyl; $X^2$ is halogen; n is an integer of 1 to 4; and m is 0 or an integer of 1 to 3 with the proviso that the sum of n and m is 4; and with the further proviso that if two titanium-containing compounds are used said first and said second titanium-containing compounds are not identical.

15. The process of claim 14 wherein the catalyst is obtained by an organoaluminum cocatalyst and an optional silane cocatalyst of the formula $R'_a(OR'')_{4-a}$ Si where R' and R'' are hydrocarbyl groups are present with the titanium catalyst.

16. The process of claim 7 wherein the catalyst is obtained by (a) treating an inert inorganic support to a temperature of 100°–150° C. for ½ to 3 hours to remove surface hydroxyl groups; (b) contacting the treated inert inorganic compound with a hydrocarbon soluble magnesium compound; (c) contacting the product of said step (b) with a modifying compound selected from the group consisting of silicon halides, boron halides, aluminum halides, alkyl silicon halides, hexaalkyl disilazanes and mixtures thereof; and (d) contacting the product of said step (c) with a vanadium compound having the structural formula $V(O_2)X^1_{4-s}$, is halogen and s is 0 or 1; a first titanium-containing compound having the structural formula $TiX^3_p(OR^3)_q$, where $X^3$ is halogen $R^3$ is hydrocarbyl, p is an integer of 1 to 4, and q is 0 or an integer of 1 to 3, with the proviso that the sum of p and q are 4 and, optionally, a second titanium-containing compound of the formula $Ti(OR^2)_n X^2_m$, where $R^2$ is hydrocarbyl, $X^2$ is halogen, n is an integer of 1 to 4, and m is 0 or an integer of 1 to 3 with the proviso that the sum of n and m is 4; and with the further proviso that if two titanium-containing compounds are used said first and said second titanium-containing compounds are not identical.

17. The process of claim 16 wherein an organoaluminum cocatalyst and an optional silane cocatalyst of the formula $R'_a(OR'')_{4-a}$ Si where R' and R'' are hydrocarbyl groups are present with the titanium catalyst.

18. The process of claim 5 wherein the process limits for $Q_c$ range from 0.95 to 1.30.

19. The process of claim 18 wherein the ethylene feed to the first reactor is adjusted to maintain $Q_A$ within the defined limits.

20. The process of claim 18 wherein the ethylene feed to the second reactor is adjusted to maintain $Q_A$ within the defined limits.

21. The process of claim 18 wherein the ethylene feeds to both the primary and secondary reactors are adjusted to maintain $Q_A$ within the defined limits.

22. A copolymer of propylene with from 3 to 47 weight percent ethylene and having a value for Q in the range 0.90 to 1.35 where Q is determined using integrated areas of the $^{13}$C NMR spectrum of the copolymer in accordance with the equation:

$$Q=A/B$$

where $A=1.167R_1+0.75R_2+1.5R_3+1.5R_4+1.167R_8$ $B=0.667R_1+0.5R_2+R_5+R_6+R_7+0.667R_8$ and $R_1$ through $R_8$ have the following peak assignments $R_1$ 37.9 PPM
$R_2$ 37.5 PPM
$R_3$ 33.2 PPM
$R_4$ 31.2—30.9 PPM
$R_5$ 30.4 PPM
$R_6$ 30.0 PPM
$R_7$ 27.4 PPM
$R_8$ 24.9 PPM 23. The copolymer of claim 22 having a flexural modulus from 20,000 psi to 100,000 psi and wherein the ethylene content is from 8 to 40 weight percent.

24. The copolymer of claim 23 which is further characterized by the substantial absence of a secondary peak in the DSC profile in the range of 115°–125° C.

25. The copolymer of claim 24 wherein the flexural modulus is from 40,000 psi to 70,000 psi and the value for Q is in the range 0.95 to 1.30.

26. The copolymer of claim 25 containing from 80 to 91 weight percent propylene and 9 to 20 weight percent ethylene.

27. The copolymer of claim 26 prepared in accordance with the process of claim 2.

* * * * *